C. P. BASS.
RATCHET DRIVING MECHANISM FOR CUTTERS.
APPLICATION FILED NOV. 19, 1913.
1,141,682.
Patented June 1, 1915.
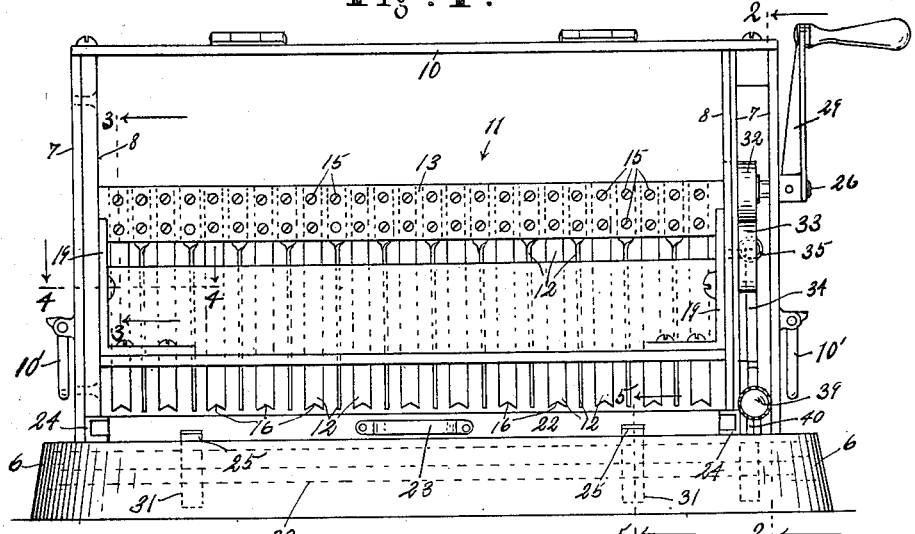
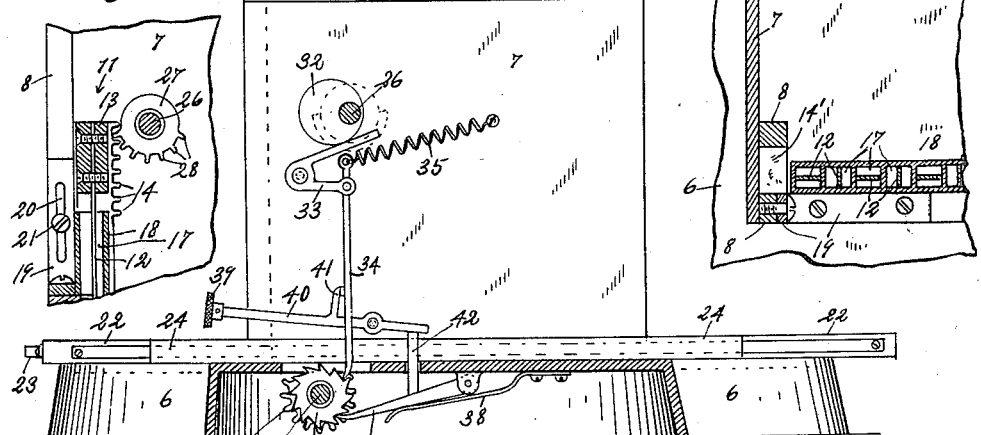
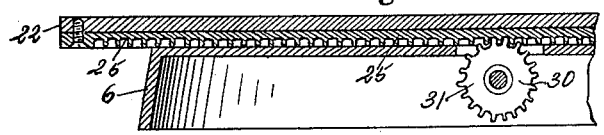
WITNESSES:
INVENTOR.
Charles P. Bass
By
ATTORNEY.

UNITED STATES PATENT OFFICE.

CHARLES P. BASS, OF LOS ANGELES, CALIFORNIA.

RATCHET DRIVING MECHANISM FOR CUTTERS.

1,141,682.

Specification of Letters Patent. Patented June 1, 1915.

Application filed November 19, 1913. Serial No. 802,004.

*To all whom it may concern:*

Be it known that I, CHARLES P. BASS, a citizen of the United States of America, residing at Los Angeles, county of Los Angeles, State of California, have invented a certain new and useful Ratchet Driving Mechanism for Cutters; and I do hereby declare the following to be a full, clear, and exact description of the invention, such as will enable others skilled in the art to which it appertains to make and use the same.

This invention relates to ratchet driving mechanism for cutters, and it may be said to consist in the provision of the novel and advantageous features and in the novel and improved construction, arrangement, and combination of parts and devices as will be apparent from the description and claim which follow hereinafter.

One object of the invention is to provide novel and improved driving mechanism more particularly designed for use on apparatus for cutting the sinews of tough meat to make such meat very like tender meat so that it shall be easy to cut and much more satisfactory to eat.

Further objects of the invention are to provide novel and improved driving mechanism more particularly designed for use on apparatus of the nature specified which is simple and compact in construction, strong and durable, economical to manufacture, convenient to use, and effective for its purpose.

Other objects and the advantages of the invention will be apparent to those skilled in the art from a consideration of the following description of the preferred form of apparatus embodying it, taken in connection with the accompanying drawings in which—

Figure 1 is a front elevational view of the apparatus; Fig. 2 is a sectional view taken on the line 2—2 of Fig. 1; Fig. 3 is a broken sectional view taken on the line 3—3 of Fig. 1; Fig. 4 is a broken sectional view taken on the line 4—4 of Fig. 1; and Fig. 5 is a broken sectional view taken on the line 5—5 of Fig. 1.

The frame of the apparatus consists of the base 6, preferably hollow on its underside, the uprights 7 disposed on opposite sides of the base 6, the vertical guides 8, the crosspiece 9 at the top of the uprights 7, the door 10 hingedly connected to the crosspiece 9, and ring handles 10' on the uprights 7.

On the frame of the apparatus is movably mounted the sinew cutter 11 which consists of a plurality of substantially vertical blades 12 having the top portions thereof secured to a cross-head 13 which latter has its end portions disposed adjacent to the guides 8 and provided with rack teeth 14 thereon.

As shown, the top portions of the blades 12 are preferably arranged in a slit in the cross-head 13 and secured by screws 15 passing through the cross-head. The lower end of the blades 12 are sharp and preferably formed with notches 16 to more effectively catch and cut sinews of meat. Each successive blade 8 is preferably disposed at right angles to the preceding blade so that both longitudinal and cross sinews may be cut. Blocks 14' of suitable material are arranged adjacent to the guides 8 to cushion the sinew cutter.

The blades 12 pass through openings 17 in the cross-bar 18 which prevents the meat being raised when the blades are raised. The cross-bar 18 is preferably adjustable for different thicknesses of meat by means of brackets 19 on the cross-bar which brackets are formed with slots 20 through which screws 21 pass into the frame of the apparatus.

A slide 22, provided with a handle 23 at the front thereof, has its end portions fitted in guideways 24 on the base 6 and is provided with rack bars 25 on its underside.

A shaft 26 bears in the uprights 7 and has thereon mutilated gears 27 having teeth 28 adapted to mesh with the teeth 14 and raise the sinew cutter when the shaft is turned by the crank 29.

It will be understood that when the crank 29 is turned the sinew cutter is intermittently raised and allowed to drop so that the blades 12 penetrate and cut the sinews of meat placed on the slide 22. The blades 12 and the cross-bar 18 are preferably nickel plated so as to clean easily. In cleaning the blades 12 the sinew cutter may be raised out of the frame of the apparatus through the door 10.

Automatic means is preferably provided for moving the slide 22 to have the sinew cutter act on the whole piece of meat that may be placed on the slide. The means shown consists of a shaft 30 which bears on the base 6 and has thereon spur wheels 31 in mesh with the teeth of the rack bars 25;

the shaft 30 being operatively connected with the shaft 26 by means of a cam 32 on the shaft 26 which cam bears against a bell crank 33 which latter is pivotally mounted on one of the uprights 7 and is pivotally connected to a pawl 34 which by means of a spring 35 is held against the ratchet wheel 36 mounted on the shaft 30. A dog 37 may be pivotally mounted on the base 6 and pressed against the ratchet wheel 36 by the spring 38. It will be understood that the automatic means just described effects an intermittent rearward movement of the slide 22 when the crank 29 is operated.

The pawl 34 and dog 37 may be disengaged from the ratchet wheel 36 at will to permit of the slide 22 being moved forward, by raising the head 39 of the lever 40 which latter is pivotally mounted on one of the uprights 7 and is provided with an arm 41 bearing against the pawl 34 and has its rear end portion bearing on a bar 42 which latter bears on the dog 37.

While one form of construction embodying the invention has been particularly illustrated and described, many changes and modifications thereof will occur to those skilled in the art—wherefore the right is reserved to all such changes and modifications as do not depart from the spirit and scope of the invention as defined in the appended claim.

I claim:

In apparatus of the class specified, the combination of a shaft, a second shaft, a ratchet wheel on the second shaft, a spring-pressed dog bearing against the ratchet wheel, a pivotally mounted bell crank, a cam on the first mentioned shaft adapted to bear against the bell crank, a pawl pivotally connected to the bell crank, a spring arranged to hold the pawl against said ratchet wheel, and means for moving the dog and the pawl away from the ratchet wheel at will, consisting of a pivotally mounted lever having an arm thereon bearing against said pawl, and a bar interposed between said lever and said dog.

In testimony whereof, I have signed my name to this specification in the presence of two subscribing witnesses at Los Angeles, county of Los Angeles, State of California, this 13th day of November A. D. 1913.

CHARLES P. BASS.

Witnesses:
ALEX. H. LIDDERS,
ELLA SCOTT.

Copies of this patent may be obtained for five cents each, by addressing the "Commissioner of Patents, Washington, D. C."